United States Patent
Da Pont et al.

(10) Patent No.: US 9,695,954 B2
(45) Date of Patent: Jul. 4, 2017

(54) ELECTRIC VALVE DEVICE, IN PARTICULAR FOR A DEVICE FOR FORMING ICE IN A FRIDGE

(75) Inventors: Paolo Da Pont, Turin (IT); Maurizio Rendesi, Villarbasse (IT); Giosue Capizzi, Buttigliera (IT); Paolo Ravedati, Moncalieri (IT)

(73) Assignee: ELBI INTERNATIONAL, S.P.A., Turin (IT)

( * ) Notice: Subject to any disclaimer, the term of this patent is extended or adjusted under 35 U.S.C. 154(b) by 124 days.

(21) Appl. No.: 14/008,988

(22) PCT Filed: Apr. 2, 2012

(86) PCT No.: PCT/IB2012/051604
§ 371 (c)(1),
(2), (4) Date: Sep. 30, 2013

(87) PCT Pub. No.: WO2012/131657
PCT Pub. Date: Oct. 4, 2012

(65) Prior Publication Data
US 2014/0021388 A1    Jan. 23, 2014

(30) Foreign Application Priority Data
Apr. 1, 2011 (IT) .............................. TO2011A0291

(51) Int. Cl.
*F16K 31/06* (2006.01)
*F16K 27/02* (2006.01)
*F16K 11/22* (2006.01)

(52) U.S. Cl.
CPC ........ *F16K 31/0658* (2013.01); *F16K 27/029* (2013.01); *Y10T 137/87877* (2015.04)

(58) Field of Classification Search
CPC ........................... F16K 27/029; F16K 31/0658
(Continued)

(56) References Cited

U.S. PATENT DOCUMENTS 3,095,902 A * 7/1963 Walter .......................... 137/554
3,420,260 A * 1/1969 Wisniewski ............. 137/315.03
(Continued)

FOREIGN PATENT DOCUMENTS

JP    60-088285 A    5/1985
JP    2001-267124 A    9/2001

OTHER PUBLICATIONS

Italian patent application TO2010A000506 dated Dec. 15, 2011.
International Search Report of PCT/IB2012/051604 dated Jan. 14, 2013.

*Primary Examiner* — John K Fristoe, Jr.
*Assistant Examiner* — Seth W Mackay-Smith
(74) *Attorney, Agent, or Firm* — Sughrue Mion, PLLC

(57) ABSTRACT

An electric valve device including a hollow body with an inlet and an outlet for a flow of fluid, in particular a liquid, between which, inside said body, there is defined a chamber in which there is provided a valve seat intended to cooperate with an associated closing member for controlling communication between the inlet and the outlet; and a tubular guiding formation which is nominally coaxial with the valve seat and inside which there is mounted, axially displaceably to and from the seat, a core which carries the closing member and the position of which with respect to the seat can be electromagnetically controlled by means of a winding or solenoid arranged around said tubular formation. The hollow body and the tubular guiding formation are made as a single piece of moulded plastic.

11 Claims, 6 Drawing Sheets

(58) Field of Classification Search
USPC .................................. 137/883; 251/129.15
See application file for complete search history.

(56) References Cited

U.S. PATENT DOCUMENTS

| | | | |
|---|---|---|---|
| 3,529,806 A * | 9/1970 | Kozel | 251/129.21 |
| 4,621,788 A * | 11/1986 | DeLew et al. | 251/120 |
| 4,697,608 A * | 10/1987 | Kolze et al. | 137/1 |
| 4,711,265 A * | 12/1987 | Davis et al. | 137/454.2 |
| 4,815,497 A * | 3/1989 | Pick | 137/883 |
| 4,830,333 A * | 5/1989 | Watson | 251/129.18 |
| 5,234,032 A | 8/1993 | Kline et al. | |
| 5,358,215 A * | 10/1994 | Buth et al. | 251/129.21 |
| 5,586,747 A | 12/1996 | Bennardo et al. | |
| 6,913,203 B2 * | 7/2005 | DeLangis | 236/12.12 |
| 6,927,501 B2 * | 8/2005 | Baarman et al. | 290/43 |
| 7,222,642 B2 * | 5/2007 | DuHack et al. | 137/883 |

\* cited by examiner

ELECTRIC VALVE DEVICE, IN PARTICULAR FOR A DEVICE FOR FORMING ICE IN A FRIDGE

CROSS REFERENCE TO RELATED APPLICATIONS

This is a National Stage of International Application No. PCT/IB2012/051604 filed Apr. 2, 2012, claiming priority based on Italian Patent Application No. TO2011A000291 filed Apr. 1, 2011, the contents of all of which are incorporated herein by reference in their entirety.

BACKGROUND OF THE INVENTION

Field of the Invention

The present invention relates in general to an electric valve device and in particular an electric valve which can be used in a device for forming ice in a fridge, comprising:

- a hollow body with an inlet and an outlet for a flow of fluid, in particular a liquid, between which, inside said body, there is defined a chamber in which there is provided a valve seat intended to cooperate with an associated closing member for controlling communication between the inlet and the outlet; and
- a tubular guiding formation which is nominally coaxial with the valve seat and inside which there is mounted, axially displaceably to and from said seat, a core which carries the closing member and the position of which with respect to the valve seat can be electromagnetically controlled by means of a winding or solenoid arranged around said tubular formation.

Background

In order to control flows which characteristically have small flow-rates, electric valve devices which are normally used for medium/high flow-rates, for example in household appliances, are often used, suitably modified for operation at small flow-rates.

An example of such an electric valve assembly for the metered supply of cold water in a fridge is described and illustrated in Italian patent application TO2010A000506 in the name of the same Applicant.

These modified electric valve devices generally have relatively large valve chambers having, formed inside them, valve seats with a small diameter depending on the flow-rates envisaged. Such modified electric valve devices in general have dimensions which are unnecessarily large in relation to the requirements.

Moreover, in such electric valve devices the valve body is generally formed as two parts which are firmly connected together by means of a threaded union. The tubular guiding formation inside which the core carrying the closing member is mounted is generally made as one piece with one of these parts and, following assembly, may not be perfectly coaxial with the valve seat, with potential problems in terms of reliability of operation of the electric valve device as a whole.

SUMMARY OF THE INVENTION

One object of the present invention is to propose an electric valve device for small flow-rates which is able to overcome the abovementioned drawbacks of the solutions according to the prior art.

This object, together with other objects, is achieved according to the invention by an electric valve device of the type specified above, characterized primarily in that the abovementioned body and the tubular guiding formation are made as one piece of moulded plastic.

In one embodiment the distal end of said tubular formation, opposite the valve seat, is closed by a plug or cover separate from and connected to said tubular formation.

In an advantageous embodiment the aforementioned plug or cover is conveniently used also to lock axially on the valve body the assembly formed by the winding or solenoid and the associated structure for conduction of the magnetic flux generated by this winding or solenoid.

In another embodiment the distal end of this tubular formation is blind, being formed as one piece, and the valve seat is formed as a separate part fixed inside the valve chamber, for example by means of welding or bonding.

Conveniently, the chamber of the valve body has substantially the same cross-section as the passage defined inside said tubular formation.

BRIEF DESCRIPTION OF THE DRAWINGS

Further characteristic features and advantages of the invention will become clear from the following detailed description provided purely by way of a non-limiting example, with reference to the accompanying drawings in which.

DETAILED DESCRIPTION OF THE INVENTION

Figure 1:
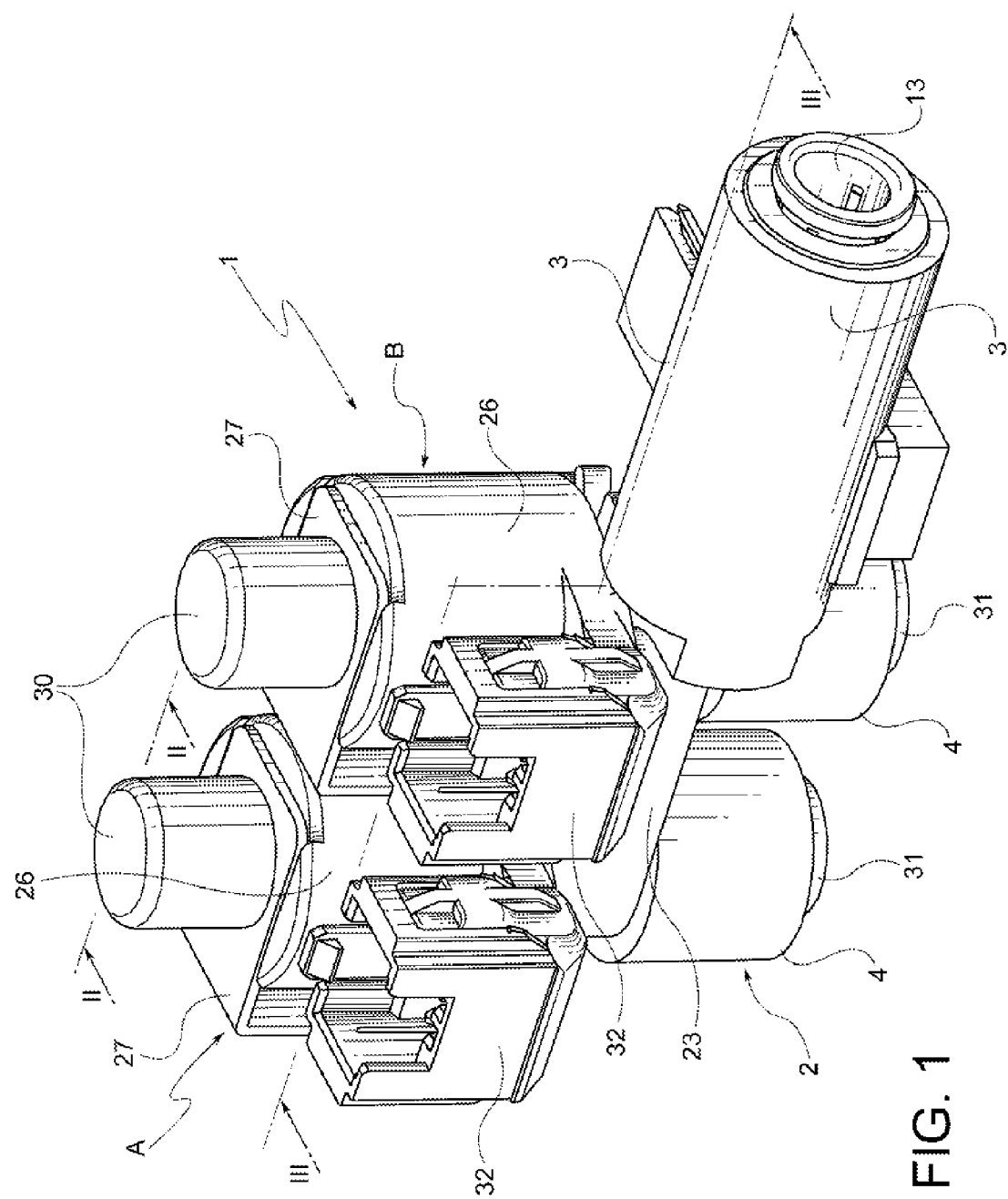
FIG. 1 is a perspective view of a twin electric valve device provided according to the present invention.

In FIG. 1 an electric valve device according to the present invention is denoted overall by 1.

In the exemplary embodiment shown, the device 1 is of the twin type, in that it comprises two electric valves, denoted by A and B, which are formed with a common single-piece valve body 2 with a single tubular inlet conduit 3 and respective outlets 4 for the fluid.

The invention is not, however, limited to such a "twin" embodiment, but also embraces within its scope other embodiments comprising an electric valve of the multiple type (three or more units) or single type.

Figure 2:
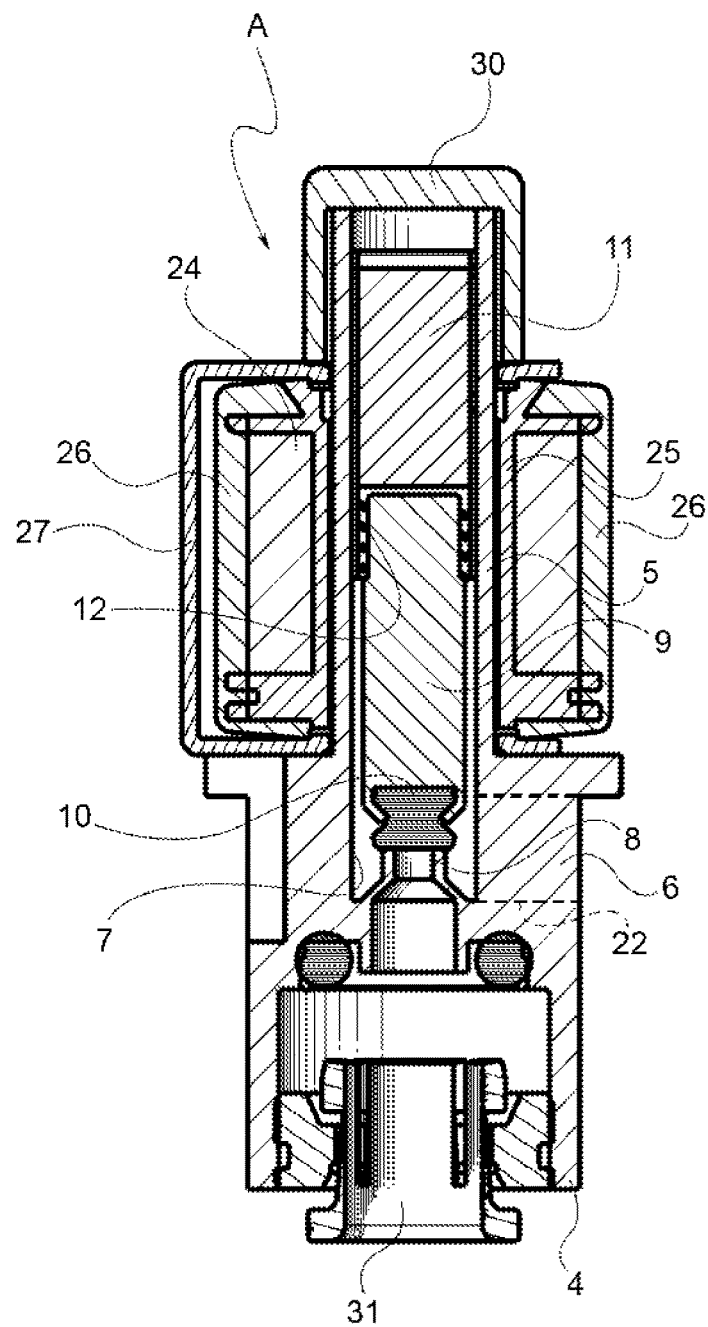
FIG. 2 is a cross-sectional view along the line II-II of FIG. 1.

FIG. 2 shows a cross-sectional view of solely the electric valve A. The electric valve B has the same general configuration.

In the embodiment shown, the valve body 2 (see in particular FIG. 4) is made as a single piece of moulded plastic. This body 2 has in particular two cylindrical tubular formations 5 (FIGS. 2 and 4) which are parallel to each other.

Figure 5:
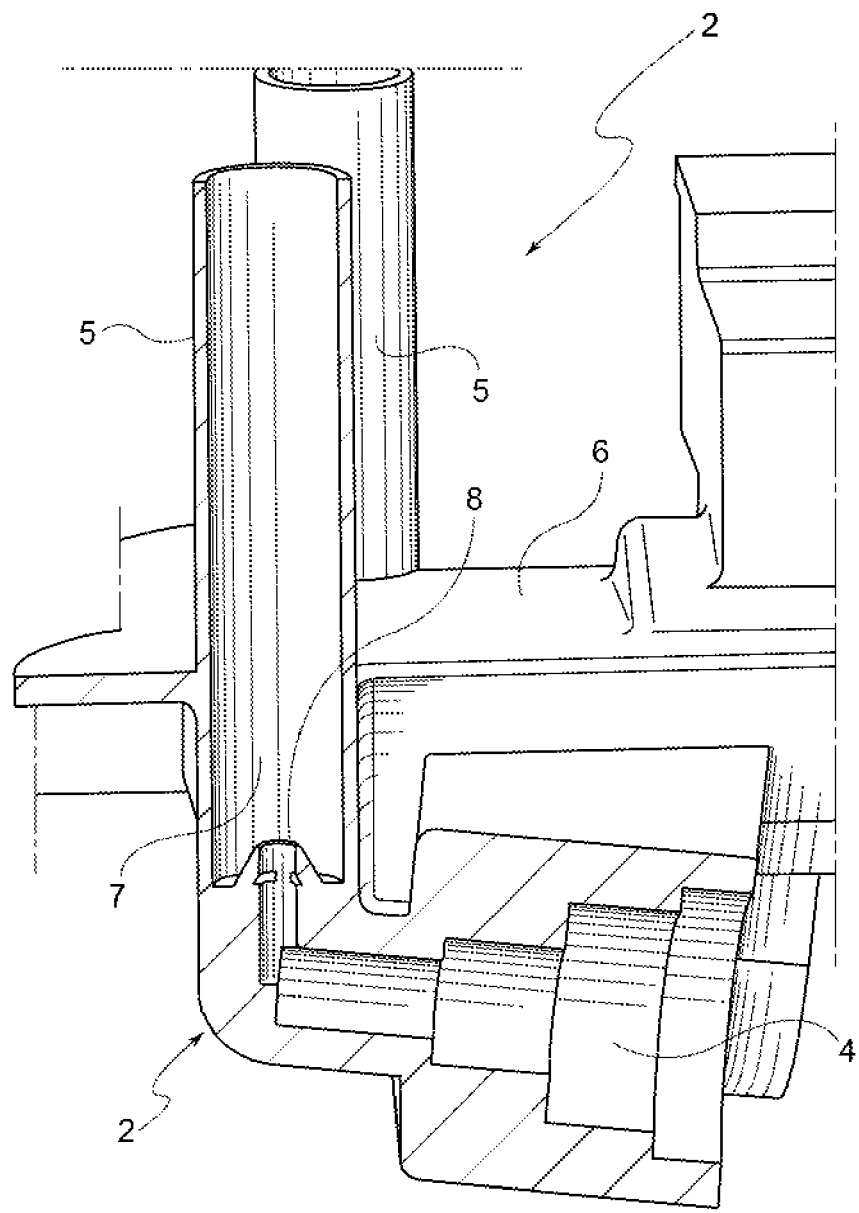
FIG. 5 is a perspective view of an alternative design of the valve body.

As can be seen in particular in FIG. 2, for each electric valve A (B), the tubular formation 5 of the body 2 extends from a corresponding hollow block or body 6 which forms integrally, in its bottom part, the respective outlet 4 in the form of a tubular formation preferably coaxial with the top tubular formation 5. Alternatively, the outlets 4 may be formed frontally, or oriented in a direction forming an angle with respect to the axis of the corresponding tubular formation 5, but still as one piece with the block or body 6, as for example shown in FIG. 5.

Inside each hollow block or body 6 there is defined a respective valve chamber 7 (FIGS. 2 and 3) in which a valve seat 8 coaxial with the tubular formation 5 is formed.

Inside the tubular formation 5 of each section or electric valve A, B there is mounted, axially displaceably, a ferromagnetic core 9 which, at the bottom end, carries a closing member 10 intended to co-operate with the corresponding valve seat 8.

Conveniently, the valve chamber 7 has transversely the same cross-section as the passage defined inside the tubular formation 5, as can be understood in particular when viewing FIG. 2.

In the exemplary embodiment shown, a respective ferromagnetic element 11, acting as a fixed core, co-operating with the associated movable core 9, is fixed in the distal portion of each tubular formation 5 (FIG. 2). A spring 12, tending to push the movable core 9 towards the valve seat 8, is formed between each fixed core 11 and the associated movable core 9.

Embodiments without a fixed core are however possible.

Figure 3:
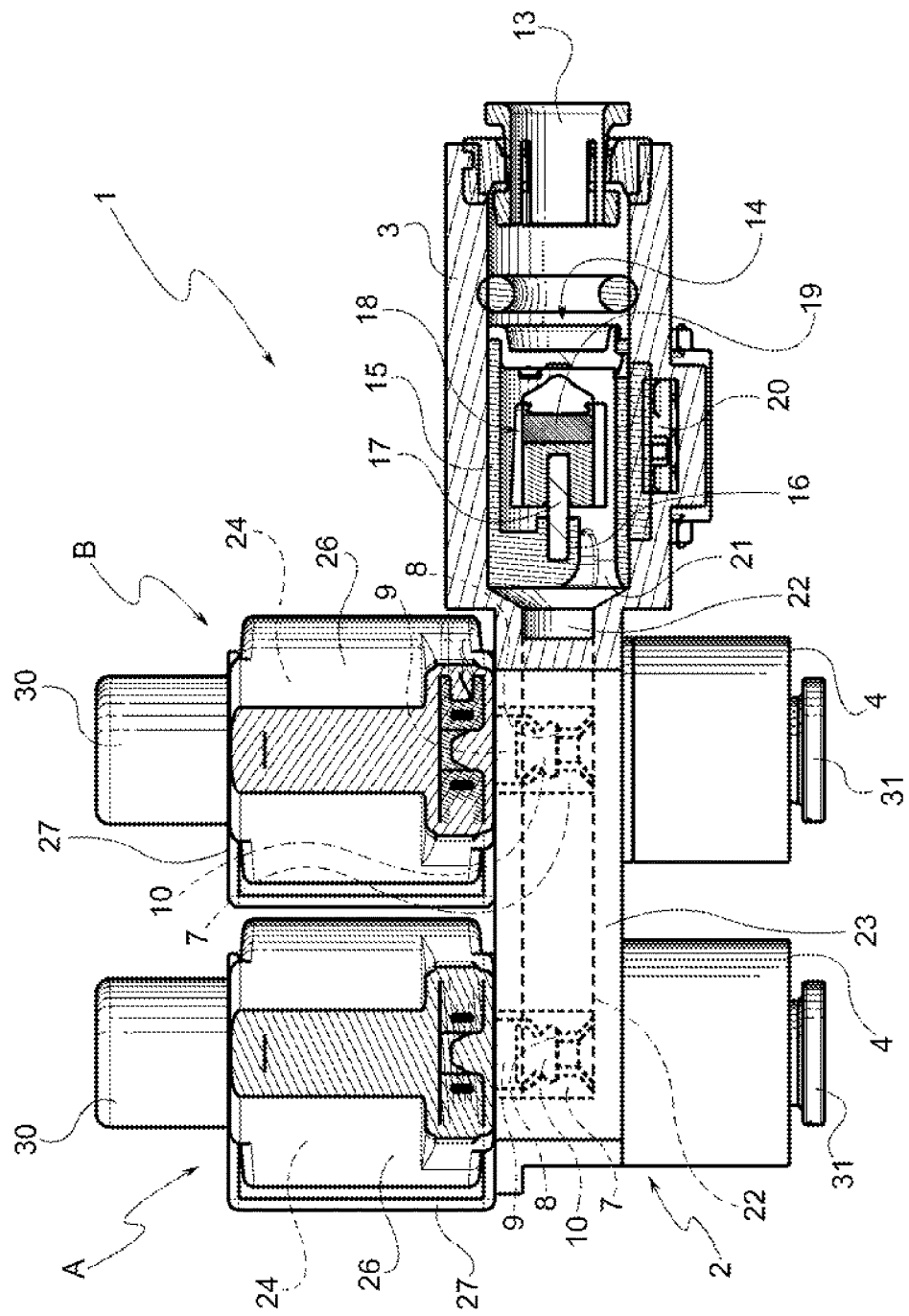
FIG. 3 is a cross-sectional view along the line III-III of FIG. 1.
Figure 4:
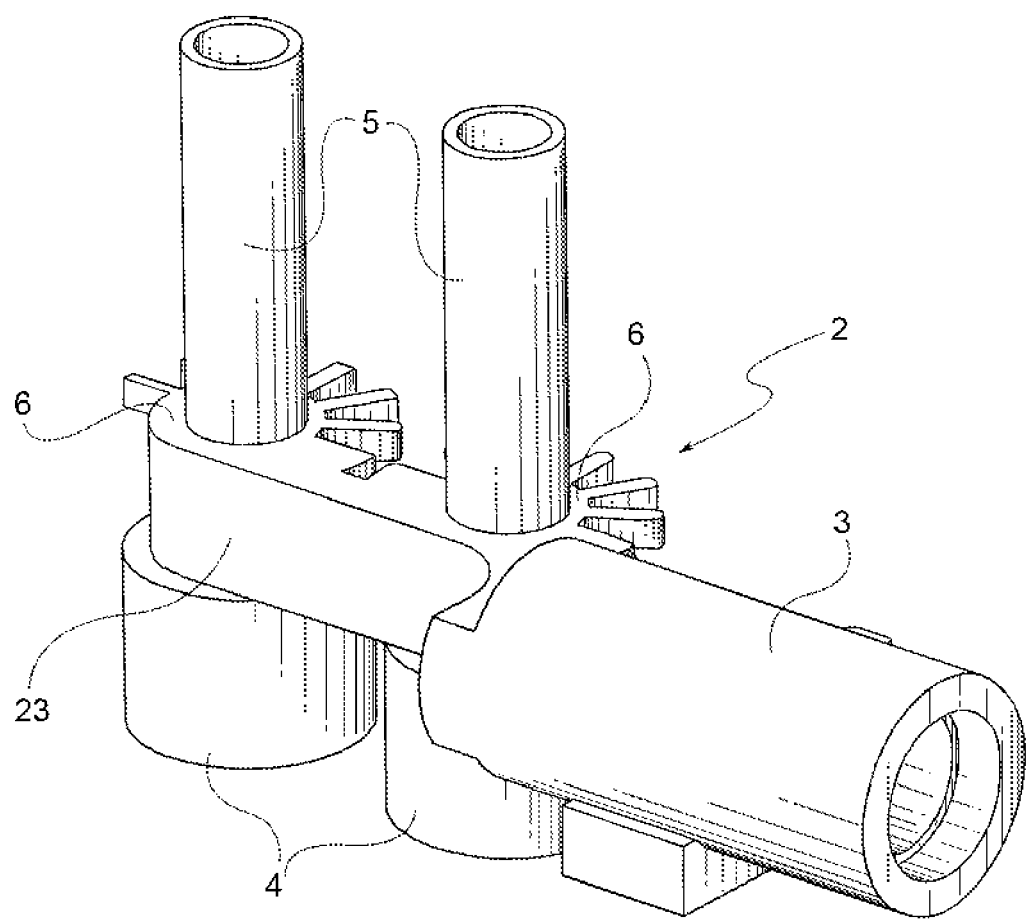
FIG. 4 is a perspective view which shows a single-piece moulded plastic body included in the electric valve device according to the preceding figures.

With reference to FIGS. 1, 3 and 4, the single-piece body 2 of the electric valve device integrally forms the cylindrical inlet conduit 3. In the embodiment shown by way of example (see FIG. 3) the distal end of the cylindrical inlet conduit 3 is provided with a quick-fit coupling 13 for connection of an external inlet pipe (not shown). The quick-fit coupling 13 is for example a coupling manufactured by the company John Guest.

Alternatively, in place of a quick-fit coupling, the conduit 3 may be provided with a coupling of another type, known per se, for example a threaded union, preferably formed as one piece with this conduit and with the overall body 2.

As can be seen in FIG. 3, a flow-rate measuring device, denoted overall by 14, may be conveniently mounted inside the cylindrical inlet conduit 3. In the embodiment shown by way of example this flow-rate measuring device 14 is contained in an essentially cylindrical, cartridge-like, support casing 15 inserted in the passage defined in the inlet conduit 3 and having an external diameter which is close to that of the quick-fit coupling 13.

In the embodiment shown the body 15 has a mainly tubular form and, at one end, has a central hub 16 inside which a pin 17 which defines the axis of rotation of a bladed impeller 18 provided with a permanent magnet 19 is axially fixed.

During operation, a flow of liquid supplied to the inlet conduit 3 acts on the bladed impeller 18, causing a rotation thereof around the axis defined by the pin 17. The corresponding rotation of the magnet 19 is detected by means of a circuit of the type known per se, the components of which are mounted on a board 20 (FIG. 3) housed inside a seat provided in the wall of the conduit 3. The speed of rotation of the impeller 18 is dependent on the flow-rate of the liquid flow acting on it and causes the generation of an electric signal, the frequency (or phase) of which forms a reliable indication of said flow-rate.

With reference to FIG. 3, the support casing 15 of the flow-rate measuring device 14 has a plurality of outlet openings 21, only one of which can be seen in this figure. During operation, the liquid which flows out through these openings reaches a passage 22 defined inside an inlet header 23 which is formed integrally with the body 2 of the electric valve device. From the inlet conduit 3 the header 23 reaches firstly the chamber 7 of the electric valve B and then the chamber 7 of the electric valve A (see in particular FIG. 3).

These electric valves A, B are therefore able to control communication between the inlet conduit 3 and the respective outlet 4.

In variations of embodiments not shown the support casing 15 may be made as one piece with the end 2.

Figure 6:
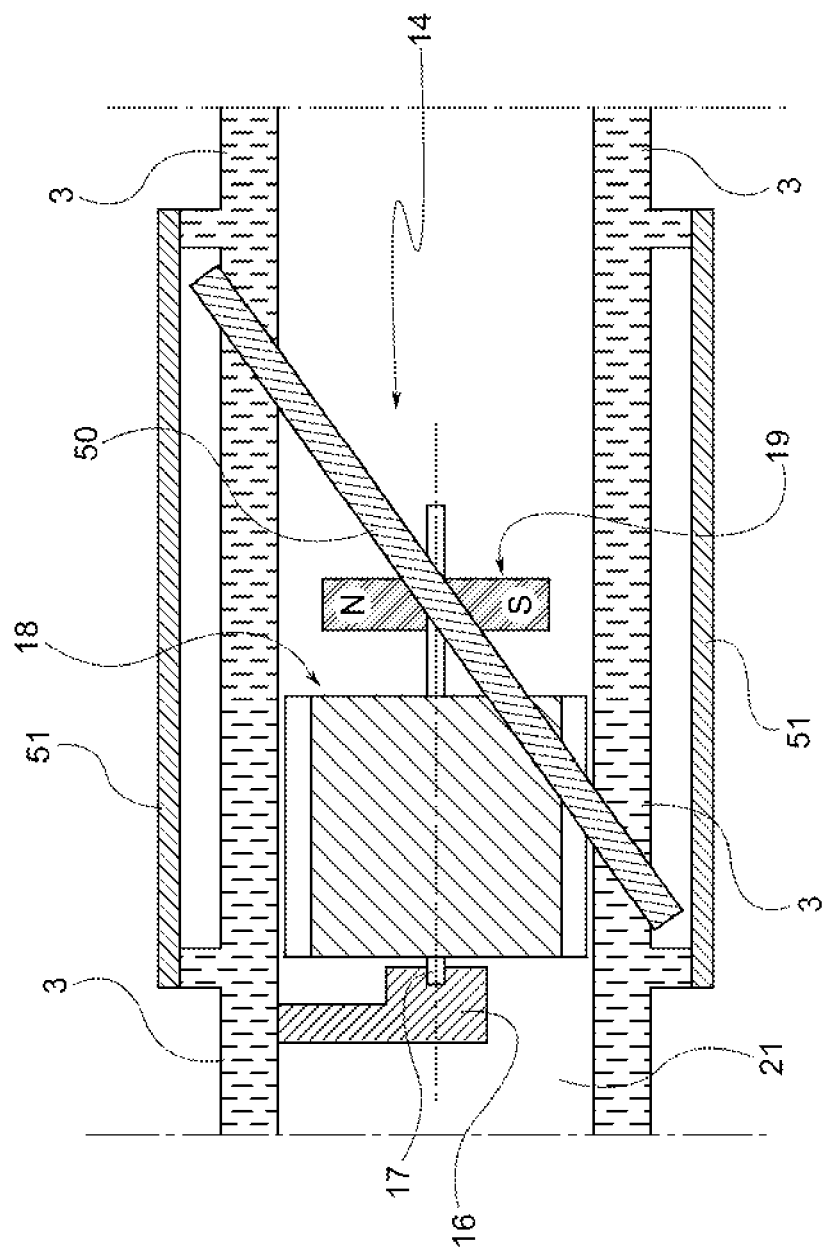
FIG. 6 is a schematic view of an alternative design of the flow rate measuring device.

FIG. 6 shows in schematic form a variation of embodiment of the flow-rate measuring device 14. In this figure, parts already described have been assigned again the same reference numbers used previously.

In the embodiment according to FIG. 6, the flow-rate measuring device 14 comprises an impeller or turbine 18 and a permanent magnet 19 integral therewith, rotation thereof being detected by means of a winding 50, the axis of which forms an angle, for example of about 40°, with respect to the axis of the turbine or impeller 18. The winding 50 is arranged around a portion of the cylindrical inlet conduit 3 which, as already mentioned previously, is made of non-magnetic material, in particular plastic. Said portion of the inlet conduit 3 is conveniently surrounded by a tube or sleeve 51 of ferromagnetic material.

With reference again to FIG. 2, each electric valve of the electric valve device 1 has a respective winding or solenoid 24 mounted on a spool 25. This spool is encapsulated inside a coating 26 and is surrounded by a member 27 made of magnetically conductive material which, in the embodiment shown, is shaped essentially in the form of a C.

The assembly formed by the spool 25, the solenoid 24, the coating 26 and the element 27 is mounted on the tubular formation 5 of the associated electric valve A or B.

The distal ends of the tubular formations 5 of these electric valves are then enclosed in a fluid-tight manner by a closing element such as a cover or plug 30 (FIGS. 1 to 3). These covers or plugs may be conveniently made of non-magnetic material, in particular moulded plastic, and may be connected to the associated tubular formations 5 for example by means of heat welding or bonding.

The distal ends of the tubular formations 5 extend through the corresponding assemblies 24-27 including the windings or solenoids 24 and the magnetic-flux conducting members 27 and protrude outside these assemblies 24-27.

As can be understood in particular by viewing FIG. 2, the plugs 30 conveniently help grip and keep firmly in position the corresponding assemblies comprising the windings 24, the spools 25 and the members 27 of the associated magnetic circuits.

Conveniently, although not necessarily, the outlets 4 of the electric valves A and B may be provided with respective quick-fit couplings 31 for the connection of external outlet pipes (not shown).

With reference to FIG. 1, each of the electric valves A and B is provided with a respective electrical connector 32 for the connection of the respective winding to external driving circuits (not shown). The electric valves A and B can thus be selectively excited to open so as to allow a flow of liquid (water) from the tubular inlet conduit 3 towards the respective outlet 4.

Obviously, without affecting the principle of the invention, the embodiments and the constructional details may be significantly varied with respect to that described and illustrated purely by way of a non-limiting example, without thereby departing from the scope of the invention as defined in the accompanying claims.

The invention claimed is:

1. An electric valve device, comprising:

a hollow body with an inlet and an outlet for a flow of a liquid, between which, inside said body, there is defined a chamber in which there is provided a valve seat cooperating with an associated closing member so as to control communication between the inlet and the outlet; and a tubular guiding formation which is nominally coaxial with the valve seat and inside which there is mounted, axially displaceably to and from the valve seat, a core which carries the closing member and the position of which with respect to the valve seat can be electro-magnetically controlled by a winding or solenoid arranged around said tubular guiding formation, wherein said body and said tubular guiding formation are made as a single piece of moulded plastic, wherein said tubular guiding formation, has a distal end whose terminal portion farthest from the valve seat is closed in a fluid-tight manner by an associated closing member, and said winding or solenoid is surrounded at least in part by an associated magnetic flux conducting member, forming therewith an assembly provided with a through-opening inside which said tubular guiding formation extends, and is axially locked on said body by said closing member, wherein the distal end of said tubular guiding formation extends through the whole assembly formed of the winding or solenoid and said magnetic-flux conducting member and protrudes outside said assembly opposite the valve seat, and the associated closing member comprises a plug or cover made of non-magnetic material coupled directly to the terminal portion of said tubular guiding formation which protrudes outside said assembly, wherein the outlet for the liquid is provided in the body on the opposite side to said tubular guiding formation relative to the valve seat and is coaxial with said tubular guiding formation and the valve seat, wherein the valve seat is made as a single piece of molded plastic with said body and said tubular guiding formation, and wherein said plug or cover abuts directly against said magnetic-flux conducting member.

2. The electric valve device according to claim 1, wherein said chamber has substantially the same cross-section as the passage defined inside said tubular guiding formation.

3. The electric valve device according to claim 1, wherein said magnetic flux conducting member is shaped like a C or a U and has two facing branches through which said tubular guiding formation preferably passes.

4. The electric valve device according to claim 3, wherein a spring which tends to push the movable core towards the valve seat is arranged between the movable core and the fixed core.

5. The electric valve device according to claim 4, wherein the outlet is shaped as a cylindrical passage in which a quick-fit coupling for the connection of an external outlet pipe is fixed.

6. The electric valve device according to claim 1, wherein a ferromagnetic member acting as a fixed core cooperating with said movable core is fixed in the distal portion of said tubular guiding formation.

7. The electric valve device according to claim 1, wherein the outlet for the fluid is provided in the body and extends in a direction forming an angle with respect to the axis of said tubular guiding formation.

8. The electric valve device according to claim 1, wherein a cylindrical inlet conduit for the flow of the fluid, provided with a coupling, in particular a quick-fit coupling, for the connection of an external inlet pipe, is integrally formed in said body, a flow-rate measuring device of the kind comprising a bladed impeller being mounted in said cylindrical conduit.

9. The electric valve device according to claim 8, wherein said flow-rate measuring device is contained in an essentially cylindrical, cartridge-like, support casing inserted in said inlet conduit and having an external diameter which is close to that of the inlet coupling.

10. The electric valve device according to claim 8, wherein the flow-rate measuring device comprises a permanent magnet which is rotationally rigid with said impeller, and an associated detection winding, the axis of which forms an angle with respect to the axis of the impeller, for detecting the rotation of said magnet, a tube or sleeve made of a ferromagnetic material being arranged around the detection winding.

11. The electric valve device according to claim 1, comprising a plurality of electric valves substantially identical to each other, the valve bodies of which are formed as a single body and wherein a single cylindrical inlet conduit is coupled to the valve chambers of said electric valves by an inlet manifold, said cylindrical inlet conduit and said manifold being made as one piece with the valve bodies of said electric valves.

* * * * *